United States Patent
Gruber et al.

(10) Patent No.: US 9,644,571 B2
(45) Date of Patent: May 9, 2017

(54) INTERNAL COMBUSTION ENGINE

(71) Applicant: GE Jenbacher GmbH & Co OG, Jenbach (AT)

(72) Inventors: Friedrich Gruber, Hippach (AT); Gunther Wall, Bad Haring (AT); Michael Url, Neufahrn (AT); Sebastian Zauner, Ainring (DE)

(73) Assignee: GE JENBACHER GMBH & CO OG, Jenbach (AT)

( * ) Notice: Subject to any disclaimer, the term of this patent is extended or adjusted under 35 U.S.C. 154(b) by 243 days.

(21) Appl. No.: 14/060,893

(22) Filed: Oct. 23, 2013

(65) Prior Publication Data
US 2014/0109866 A1 Apr. 24, 2014

(30) Foreign Application Priority Data

Oct. 24, 2012 (AT) .................................. 1144/2012

(51) Int. Cl.
*F02B 7/00* (2006.01)
*F02M 21/02* (2006.01)
(Continued)

(52) U.S. Cl.
CPC .... *F02M 21/0215* (2013.01); *F02M 21/0227* (2013.01); *F02M 25/12* (2013.01);
(Continued)

(58) Field of Classification Search
CPC ........ F02M 27/00; F02M 23/00; F02M 25/12; F02M 21/0227; F02M 21/0215;
(Continued)

(56) References Cited

U.S. PATENT DOCUMENTS 3,809,039 A * 5/1974 Alquist ................... F02D 21/08
123/274
4,959,612 A 9/1990 Luyten
(Continued)

FOREIGN PATENT DOCUMENTS

| CN | 1200438 | 12/1998 |
| EP | 0 359 298 | 3/1990 |
| WO | 2008/150370 | 12/2008 |

OTHER PUBLICATIONS

Unofficial English Translation of German Office Action issued in connection with corresponding DE Application No. 102013017009.5 on Apr. 7, 2015.
(Continued)

*Primary Examiner* — Hai Huynh
*Assistant Examiner* — Gonzalo Laguarda
(74) *Attorney, Agent, or Firm* — Wenderoth, Lind & Ponack, L.L.P.

(57) ABSTRACT

An internal combustion engine includes one main combustion chamber for the combustion of a first combustion mixture, one pre-combustion chamber for each respective main combustion chamber for the combustion of a second combustion mixture, a first fuel gas mixer for providing the first combustion mixture, a second fuel gas mixer for providing the second combustion mixture, an air feed line and a synthesis gas feed line, a first mixture line connected to the first fuel gas mixer and the main combustion chamber, and a second mixture line connected to the second fuel gas mixer and the pre-combustion chamber. The first fuel gas mixer is connected to the synthesis gas feed line for the admixing of synthesis gas, and an open or closed loop control device is provided for open or closed loop controlling mixing ratios of fuel, air and synthesis gas in the first combustion mixture and/or second combustion mixture.

8 Claims, 2 Drawing Sheets

(51) Int. Cl.
*F02M 25/12* (2006.01)
*F02B 19/10* (2006.01)
*F02B 43/12* (2006.01)

(52) U.S. Cl.
CPC ........... *F02B 19/1019* (2013.01); *F02B 43/12* (2013.01); *Y02T 10/121* (2013.01); *Y02T 10/32* (2013.01)

(58) Field of Classification Search
CPC ...... F02B 19/1023; F02B 43/10; F02B 43/08; Y02T 10/121; Y02T 10/32; Y02T 10/125
USPC ............... 123/274, 286, 288, 1 A, 3, 27 GE, 123/525–527, 585, 590
See application file for complete search history.

(56) References Cited

U.S. PATENT DOCUMENTS

| | | |
|---|---|---|
| 5,081,969 A | 1/1992 | Long, III |
| 6,079,373 A * | 6/2000 | Kawamura ........... F01N 3/0857 123/3 |
| 6,305,346 B1 | 10/2001 | Ueda et al. |
| 6,508,209 B1 | 1/2003 | Collier, Jr. |
| 6,739,289 B2 * | 5/2004 | Hiltner .................... F02B 43/10 123/253 |
| 6,935,284 B2 * | 8/2005 | Qian ....................... F02B 43/10 123/1 A |
| 2002/0170286 A1 * | 11/2002 | Docter .................... F01N 3/206 60/275 |
| 2003/0200939 A1 | 10/2003 | Hiltner et al. |
| 2004/0045514 A1 | 3/2004 | Qian et al. |
| 2008/0295501 A1 | 12/2008 | Gong et al. |

OTHER PUBLICATIONS

Austrian Patent Office Search Report issued Apr. 23, 2013 in Austrian Patent Application No. A 1144/2012.

Chinese Search Report issued Feb. 1, 2016 in corresponding Chinese Patent Application No. 2013107574712.

English translation of Notice of Grounds for Rejection issued Oct. 20, 2016 in Korean Application No. 10-2013- 0127018.

* cited by examiner

INTERNAL COMBUSTION ENGINE

BACKGROUND OF THE INVENTION

The present invention concerns an internal combustion engine and a method of operating such an internal combustion engine.

EP 359 298 A2 discloses an internal combustion engine having a main combustion chamber and pre-combustion chamber, in which the pre-combustion chamber is fed with a synthesis gas from a reformer. As the synthesis gas is hydrogen-bearing, the ignition characteristics of the internal combustion engine are improved thereby.

WO 2008/150370 A1 discloses an internal combustion engine with exhaust gas recycling, wherein the exhaust gas is reformed in terms of its substance together with a fuel in a reformer to give synthesis gas. That serves to reduce unwanted emissions in the exhaust gas of the internal combustion engine.

The use of both positive effects as described above is difficult as the optimum synthesis gas proportion in the fuel gas is different for the two effects, depending on the respective operating point of the internal combustion engine. In addition, the gas-engine utilization of synthesis gases is restricted due to self-ignition events depending on the gas composition ($H_2$, $CO$, $CH_4$, hydrocarbons having three or more carbon atoms as well as steam) and the mode of engine operation (power output, charge, . . . ) and due to knocking depending on the gas composition.

SUMMARY OF THE INVENTION

The object of the present invention is to make the two positive effects as described above optimally usable jointly, and to partly or entirely obviate the specified limitations.

That is effected on the one hand by synthesis gas being fed at least in respect of a proportion thereof not only to the pre-combustion chamber but also to the main combustion chamber and, on the other hand, in that—preferably in dependence on the operating point of the internal combustion engine—the fuel gas compositions for the main combustion chamber and the pre-combustion chamber can be adjusted independently of each other by two separate fuel gas mixers.

The optimum operating point for the internal combustion engine can be achieved by regulating or controlling the proportion of synthesis gas. That results on the one hand from the increase in the engine efficiency in terms of combustion technology with an increasing proportion of synthesis gas (that is to say, an increasing hydrogen content in the fuel gas). On the other hand, the energy efficiency of the installation decreases with a higher proportion of synthesis gas, as higher losses occur in the reformer. That relationship is shown in FIG. 2.

US 2004/0045514 A1 discloses an internal combustion engine, wherein reaction products which have been subjected to further processing are fed from a reformer both to the main combustion chamber and also to the pre-combustion chamber. On the one hand, a high octane number is to be imparted to the fluid fuel for the main combustion chamber while, on the other hand, ignition is to be improved. However, there is no provision either for open or closed loop control of the mixing ratios.

To provide as much information as possible in regard to the condition of the engine to the open or closed loop control device device, volume flow measuring devices can be provided in the fuel feed line and/or in the air feed line and/or in the exhaust gas line and/or in the steam feed line and/or in the synthesis gas feed line, which are connected to the open or closed loop control device. The volume flow measuring devices can also be in the form of volume flow regulating valves which, in addition to volume flow measurement, have a control valve and a closed loop control circuit.

Preferably, desired mixing ratios can be calculated in the open or closed loop control device, and the mixing ratios of fuel, air and/or synthesis gas can be open or closed loop controlled in the first fuel gas mixer of the internal combustion engine and in the second fuel gas mixer of the internal combustion engine in accordance with the desired mixing ratios. The desired mixing ratios differ depending on the respective operating point and field of application and naturally for the main combustion chamber and the pre-combustion chamber of the engine.

Suitable adjustment of a defined fuel gas composition for the respective applications (high engine power output, high engine efficiency, low emissions) is intended to permit an optimum mode of engine operation depending on the fuel used and the emission requirements. In that respect, it is advantageous if the respective proportions of hydrogen, carbon monoxide and methane as well as higher hydrocarbons are set within certain concentration limits.

In order for example to optimize a gas engine for the lowest possible pollutant emissions, the first combustion mixture for the main combustion chamber (desired fuel gas composition) can include a proportion of between 20% and 30% hydrogen and a proportion of between 5% and 10% carbon monoxide (all percentages relate to proportions by volume).

As a second example, mention is to be made of a gas engine for operation with fuel which, besides methane, also contains higher hydrocarbons, in which respect an engine power output which is as high as possible is to be achieved. In that case, the desired fuel gas composition of the first combustion mixture can have proportions of between 35% and 45% hydrogen, 5% and 10% carbon monoxide, and a maximum of 5% higher hydrocarbons.

For an improved ignition characteristic and for reducing emissions of a gas engine, the desired fuel gas composition of the second combustion mixture for the pre-combustion chamber can contain between 25% and 40% hydrogen, between 5% and 10% carbon monoxide, and between 20% and 30% methane.

To make the composition of the synthesis gas well estimatable for the open or closed loop control device, a reformer transfer function can be used for calculating the desired mixing ratios. That avoids a complicated and expensive operation of measuring the various concentrations of the constituents of the synthesis gas, insofar as the concentrations of the various constituents of the synthesis gas produced are calculated depending on the volume flows of the substance flows directed into the reformer and the entry and exit temperatures in the reformer as values of the reformer transfer function. The reformer transfer function can be generated by measurements or thermodynamic simulations.

To further improve the ignition characteristic in the pre-combustion chamber, a compressor can be arranged in the second mixture line, whereby it is possible to achieve a higher injection pressure in the pre-combustion chamber.

The internal combustion engine can have a reformer for synthesis gas production, the reformer being connected to a fuel feed line and an air feed line. In that respect, it may be advantageous if the reformer is also connected to a water feed line and/or an exhaust gas line. The efficiency of the installation is increased by the recycling of the exhaust gas into the reformer.

BRIEF DESCRIPTION OF THE DRAWINGS

Further advantages and details of the invention will be apparent from the Figures and the associated specific description. In the Figures.

DETAILED DESCRIPTION OF THE INVENTION

Figure 1:
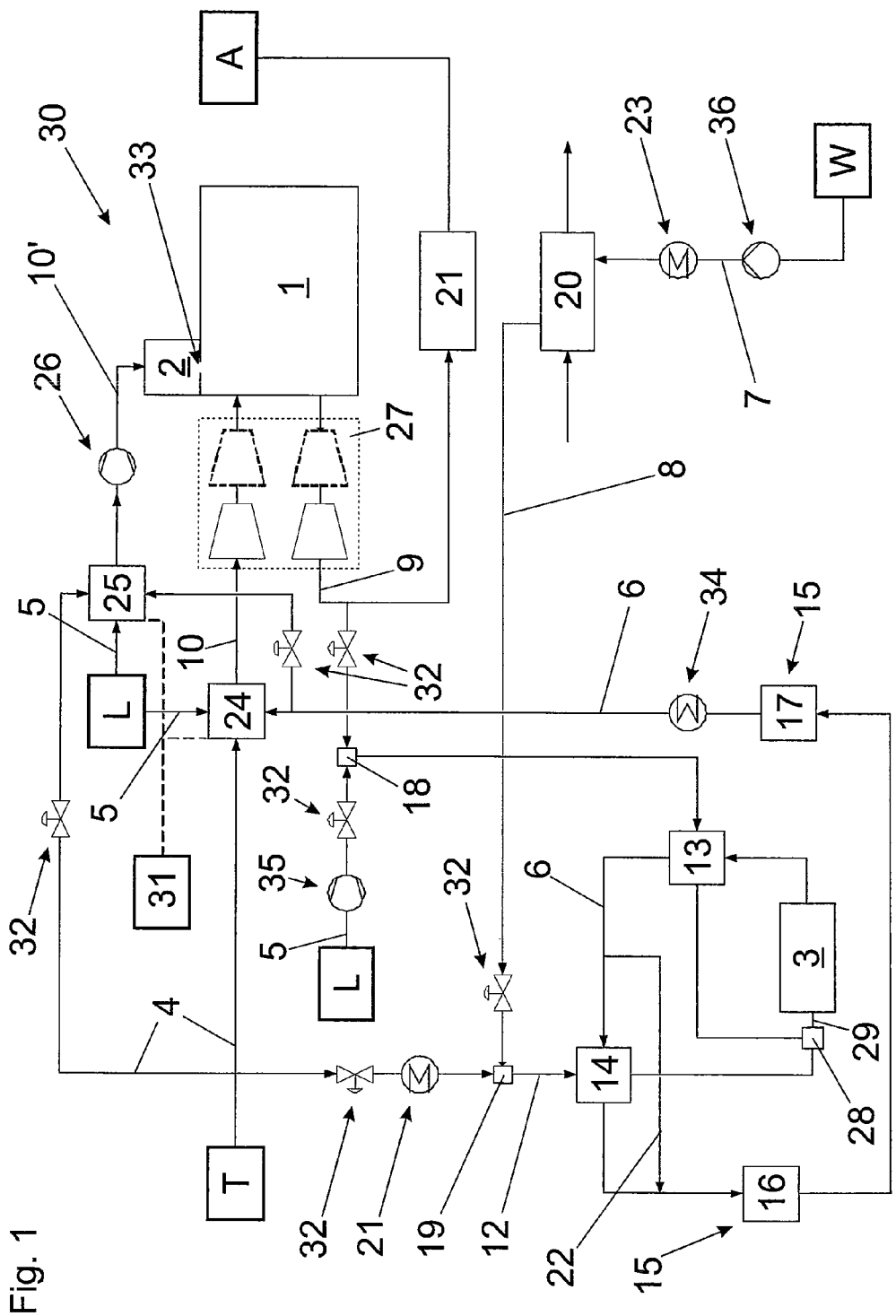
FIG. 1 is a diagrammatic view of an internal combustion engine according to the invention.

FIG. 1 shows the circuitry of an internal combustion engine-reformer installation. The Figure shows the main combustion chamber 1, the pre-combustion chamber 2 and the reformer 3. Air L is fed to the internal combustion engine 30 by the air feed lines 5, fuel is fed to the engine from a fuel reservoir T by the fuel feed lines 4 and synthesis gas S is fed to the engine by the synthesis gas feed line 6. The first fuel gas mixer 24 and the second fuel gas mixer 25 mix therefrom the first combustion mixture BG1 and the second combustion mixture BG2, respectively. The first combustion mixture BG1 is fed to the main combustion chamber 1 by the first mixture line 10 and the second combustion mixture BG2 is fed to the pre-combustion chamber 2 by way of the second mixture line 10'. When the second combustion mixture BG2 is ignited in the pre-chamber 2, an ignition flare passes through the passage opening 33 and ignites the first combustion mixture BG1 in the main combustion chamber 1. In addition, the internal combustion engine 30 can have a compressor 26 in the second mixture line 10' and a turbocharger 27. The exhaust gas A of the internal combustion engine 30 is discharged by way of the exhaust line 9.

The mixing ratios for the first fuel gas mixer 24 and the second fuel gas mixer 25 are determined in the open or closed loop control device 31, the device 31 being connected to both fuel gas mixers. The connections of the open or closed loop control device 31 to all volume flow regulating valves 32 are not shown as that would be difficult in terms of the drawing and would not contribute to understanding. There is at least one respective volume flow regulating valve 32 in the fuel feed line 4, the air feed line 5, the synthesis gas feed line 6, the steam feed line 8, and the exhaust gas line 9. By the volume flows which are regulated in the volume flow regulating valves 32 and optionally by a reformer transfer function, the control unit 31 is capable of adjusting the mixing ratios so that the desired concentrations of hydrogen, carbon monoxide, methane and so forth prevail in the combustion mixtures.

In this example, air and exhaust gas from the internal combustion engine 30 are fed by an air feed line 5 and an exhaust gas line 9 to the further (secondary) mixing device 18. A first substance flow is mixed therefrom in the further mixing device 18 and passed by the feed line 11.

Water is fed to an evaporator 20 by a water feed line 7 from a water reservoir W by the pump 36. That evaporator 20 can be of various different configurations. A preferred embodiment is one in which the evaporator 20 is in the form of a heat exchanger in heat-coupling relationship with the exhaust gas line 9 or in the form of a heat exchanger in heat-coupling relationship with the synthesis gas line 6.

A heating element 23 is arranged in the water feed line 7. This can also be in the form of a heat exchanger. In that respect, the heating element 23 can then be in heat-coupling relationship with the synthesis gas line 6 between a first cooling element 16 and a second cooling element 17, or in heat-coupling relationship with the first cooling element 16.

The steam produced in the evaporator 20 is fed to the further (secondary) mixing device 19 by a steam feed line 8. Fuel is also fed to the further mixing device 19 by a fuel line 4. A second substance flow is mixed from steam and fuel in the further mixing device 19 and passed on by the second feed line 12.

In addition, connected upstream of the mixing device 19 in the fuel line 4 is a pre-heating element 21 which can be in the form of a heat exchanger. In that case, the pre-heating element 21 can be in a heat-coupling relationship with the first cooling element 16, with a cooling circuit of the internal combustion engine, and/or with the synthesis gas line 6. The cooling circuit is not shown as it is well-known in the state of the art.

Air and exhaust gas from the internal combustion engine 30 are fed to the further mixing device 18 by an air feed line 5 and an exhaust gas line 9. The first substance flow is mixed therefrom in the further mixing device 18 and passed on by the feed line 11.

After the first feed line 11 and the second feed line 12 have passed through the first heat exchanger 13 and the second heat exchanger 14, respectively, the lines 11 and 12 open into the mixing device 28. Produced therein is a mixture which is fed to the reformer 3 by the mixture line 29. The synthesis gas feed line 6 leading out of the reformer 3 passes through the first heat exchanger 13 and the second heat exchanger 14, a bypass line 22 being provided as a bypass around the second heat exchanger 14. In addition, arranged in the synthesis gas feed line 6 is the synthesis gas cooling arrangement 15 comprising the first cooling element 16 and the second cooling element 17.

The synthesis gas can be heated again by the heating element 34 in the synthesis gas feed line 6 downstream of the synthesis gas cooling arrangement. The relative moisture content of the synthesis gas can be kept at the level suited to the engine by the succession of cooling down, water separation and heating.

A heat exchanger (pre-heating element) 21 is arranged in the exhaust gas line 9.

In this embodiment, a compressor 35 is arranged in the air feed line 5.

Figure 2:
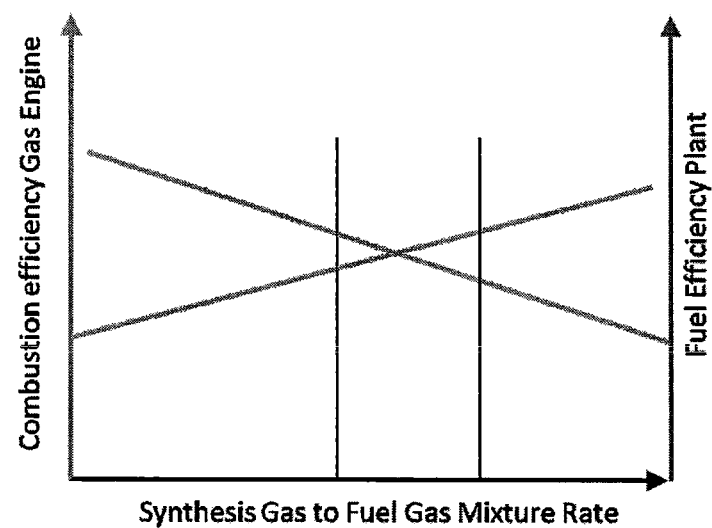
FIG. 2 is a diagram to illustrate the optimum operating point of an internal combustion engine according to the invention.

FIG. 2 shows the qualitative relationship, on the one hand, between the efficiency of the overall installation and, on the other hand, the combustion efficiency. In that case, the combustion efficiency increases due to admixing of synthesis gas while the efficiency of the overall installation rises upon an increase in the proportion of synthesis gas in the fuel gas. The optimum operating point is in the region between the vertical lines, which corresponds to the region in which the two graphs intersect.

The invention is not limited to the present embodiment. In particular, the composition of the fuel gas can also be ascertained by direct measurement or a concurrent simulation of the reformer. Those measurement or simulation values can then be communicated to the control or regulating device for controlling or regulating the mixing ratios.

The invention claimed is:

1. An internal combustion engine comprising:
at least one main combustion chamber for the combustion of a first combustion mixture,
at least one pre-combustion chamber for each respective main combustion chamber for the combustion of a second combustion mixture,
a first fuel gas mixer for providing the first combustion mixture, the first fuel gas mixer being connected to a first fuel feed line and a first air feed line,
a second fuel gas mixer for providing the second combustion mixture, the second fuel gas mixer being connected to a second fuel feed line, a second air feed line, and a synthesis gas feed line,
a first mixture line connected to the first fuel gas mixer and the main combustion chamber,
a second mixture line connected to the second fuel gas mixer and the pre-combustion chamber, the pre-combustion chamber having at least one passage opening into the main combustion chamber, and the first fuel gas mixer being connected to the synthesis gas feed line for the admixing of synthesis gas,
a reformer for producing synthesis gas, an outlet of the reformer being connected to the synthesis gas feed line, wherein both the first fuel feed line connected to the first fuel gas mixer and the second fuel feed line connected to the second fuel gas mixer are configured and arranged to bypass the reformer, and
an open or closed loop control device for open or closed loop controlling mixing ratios of fuel, air and synthesis gas in at least one of the first combustion mixture and the second combustion mixture, the open or closed loop control device being connected to at least one of the first fuel gas mixer the second fuel gas mixer.

2. The internal combustion engine as set forth in claim 1, further comprising at least one volume flow measuring device in at least one of (i) one or more of the fuel feed lines, (ii) one or more of the air feed lines, (iii) an exhaust gas line, (iv) a steam feed line, and (v) the synthesis gas feed line, the at least one volume flow measuring device being connected to the open or closed loop control device.

3. The internal combustion engine as set forth in claim 2, wherein the open or closed loop control device is configured to calculate desired mixing ratios on the basis of volume flows, and the at least one volume flow measuring device being configured to measure the volume flows, and the open or closed loop control device being further configured to open or closed loop control the mixing ratios of fuel, air, and synthesis gas in the first fuel gas mixer and in the second fuel gas mixer in accordance with the desired mixing ratios.

4. The internal combustion engine as set forth in claim 3, wherein the open or closed loop control device is configured to calculate the desired mixing ratios to achieve the desired fuel gas composition by a reformer transfer function.

5. The internal combustion engine as set forth in claim 1, wherein a compressor is arranged in the second mixture line.

6. The internal combustion engine as set forth in claim 1, wherein an inlet of the reformer is connected to at least one of a branch of the first fuel feed line and a branch of the second fuel feed line, and the inlet of the reformer is connected to at least one of the first air feed line and the second air feed line.

7. The internal combustion engine as set forth in claim 6, wherein the reformer is further connected to at least one of (i) a steam feed line and (ii) an exhaust gas line.

8. The internal combustion engine as set forth in claim 1, wherein said open or closed loop control device is configured to independently adjust the mixing ratios of fuel, air and synthesis gas for the first combustion mixture and the second combustion mixture based on an operating point of an internal combustion engine.

* * * * *